(12) United States Patent
Donnelli et al.

(10) Patent No.: US 8,131,605 B2
(45) Date of Patent: Mar. 6, 2012

(54) MACHINE HAVING AUTOMATIC COMPONENT REGISTRATION

(75) Inventors: Aaron M. Donnelli, Peoria, IL (US); Anthony D. McNealy, Peoria, IL (US); Kevin Christopher Earle, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 1520 days.

(21) Appl. No.: 11/363,256

(22) Filed: Feb. 28, 2006

(65) Prior Publication Data

US 2007/0203812 A1    Aug. 30, 2007

(51) Int. Cl.
*G06Q 10/00* (2006.01)
(52) U.S. Cl. ............................................... 705/28; 701/2
(58) Field of Classification Search .................... 342/42, 342/44, 50; 705/28
See application file for complete search history.

(56) References Cited

U.S. PATENT DOCUMENTS 5,463,567 A    10/1995    Boen et al.
(Continued)

FOREIGN PATENT DOCUMENTS

DE    195 46 775    8/1996
(Continued)

*Primary Examiner* — John Nguyen
*Assistant Examiner* — Rodney P King
(74) *Attorney, Agent, or Firm* — Finnegan, Henderson, Farabow, Garrett & Dunner LLP

(57) ABSTRACT

A component registration system for a machine is disclosed. The component registration system has a component located on the machine, a data system remote from the machine, and a controller in communication with the component and the data system. The controller is configured to automatically collect information from the component upon installation of the component onto the machine and automatically send the information to the data system to initiate a registration process.

34 Claims, 3 Drawing Sheets

U.S. PATENT DOCUMENTS

| | | | |
|---|---|---|---|
| 5,959,568 A * | 9/1999 | Woolley | 342/42 |
| 6,240,365 B1 | 5/2001 | Bunn | |
| 6,338,045 B1 | 1/2002 | Pappas | |
| 6,389,337 B1 | 5/2002 | Kolls | |
| 6,411,217 B1 | 6/2002 | Gabbard | |
| 6,476,833 B1 | 11/2002 | Moshfeghi | |
| 6,477,704 B1 | 11/2002 | Cremia | |
| 6,505,101 B1 | 1/2003 | Brill | |
| 6,674,434 B1 | 1/2004 | Chojnacki et al. | |
| 6,694,234 B2 | 2/2004 | Lockwood et al. | |
| 6,804,605 B2 | 10/2004 | Flick | |
| 6,856,820 B1 | 2/2005 | Kolls | |
| 6,915,126 B2 | 7/2005 | Mazzara, Jr. | |
| 7,242,311 B2 | 7/2007 | Hoff et al. | |
| 2002/0087356 A1 | 7/2002 | Andros et al. | |
| 2002/0156688 A1* | 10/2002 | Horn et al. | 705/26 |
| 2004/0162788 A1* | 8/2004 | Sakamoto | 705/65 |
| 2004/0210363 A1 | 10/2004 | Katagishi et al. | |
| 2005/0021645 A1 | 1/2005 | Kulkarni et al. | |
| 2005/0060070 A1 | 3/2005 | Kapolka et al. | |
| 2005/0080519 A1* | 4/2005 | Oesterling et al. | 701/1 |
| 2005/0253726 A1 | 11/2005 | Yoshida et al. | |
| 2005/0262498 A1 | 11/2005 | Ferguson et al. | |
| 2006/0011721 A1* | 1/2006 | Olsen et al. | 235/385 |

FOREIGN PATENT DOCUMENTS

| | | |
|---|---|---|
| DE | 198 50 454 | 5/2000 |
| DE | 10 2005 000 999 | 8/2005 |
| EP | 0788946 | 8/1997 |
| EP | 1 550 966 | 7/2005 |
| WO | WO 96/27513 | 9/1996 |
| WO | WO 98/53434 | 11/1998 |
| WO | WO 01/93210 A1 | 12/2001 |
| WO | WO 2004/092857 | 10/2004 |
| WO | WO 2005/109273 A1 | 11/2005 |
| WO | WO 2006/012730 A1 | 2/2006 |

* cited by examiner

MACHINE HAVING AUTOMATIC COMPONENT REGISTRATION

TECHNICAL FIELD

This disclosure relates generally to a machine and, more particularly, to a method and system for automatically registering a component of the machine.

BACKGROUND

Machines such as, for example, construction equipment, passenger vehicles, vocational trucks, and other machines known in the art are often equipped with one or more components that require continuous monthly service for operation of the components. The service could include, among other things, a phone service, an internet service, a locating service, a data acquisition service, a health monitoring and/or reporting service, or other services known in the art. For billing/reporting/activating purposes, the components may require registration to a particular user.

One example of registering a component that requires continuous service is described in U.S. Pat. No. 6,915,126 (the '126 patent) issued to Mazzara, Jr. on Jul. 5, 2005. The '126 patent describes an in-vehicle wireless communication system that requires user registration prior to activation of the system. A vehicle identification number associated with a vehicle is received by a vehicle dealer. The dealer then determines an electronic serial number of a network access device located in the vehicle based on the vehicle identification number. Identification information of a user of the vehicle is received by the dealer. The dealer then sends the electronic serial number and the user identification information to a selected wireless carrier to obtain a mobile phone number, thereby activating the communication system.

Although the method of the '126 patent may sufficiently register a vehicle wireless communication system with a phone service carrier, the method may be burdensome and limited. In particular, because the method of the '126 patent is designed for manual completion by a vehicle dealer at the time of purchase of the vehicle, it may require significant effort of the dealer at an inconvenient time and provide opportunity for error. In addition, if the vehicle is re-sold or otherwise transferred to another user, the entire manual process may need to be repeated.

The system of the present disclosure is directed towards overcoming one or more of the problems as set forth above.

SUMMARY OF THE INVENTION

In accordance with one aspect, the present disclosure is directed toward a component registration system for a work machine. The component registration system includes a component located on the work machine, a data system remote from the work machine, and a controller in communication with the component and the data system. The controller is configured to automatically collect information from the component upon installation of the component onto the work machine and automatically send the information to the data system to initiate a registration process.

According to another aspect, the present disclosure is directed toward a method of registering a component of a work machine. The method includes automatically collecting information from the component upon installation of the component onto the work machine. The method further includes automatically sending the information to a data system remote from the work machine to initiate a registration process.

DETAILED DESCRIPTION

Figure 1:
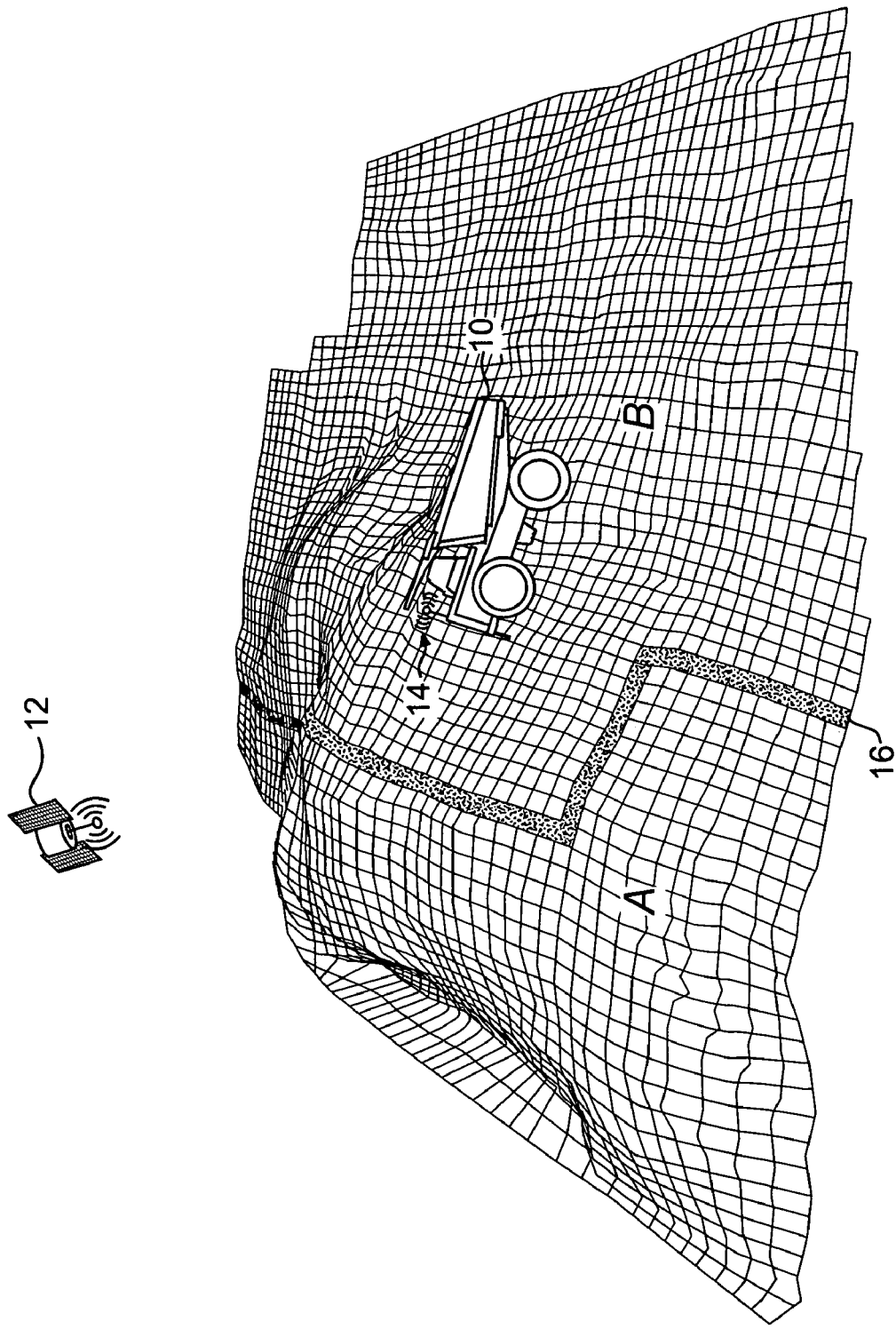
FIG. 1 is a pictorial illustration of an exemplary disclosed machine traveling between the adjacent worksites.

FIG. 1 illustrates an exemplary machine 10 traveling between adjacent worksites A and B. Each worksite may include, for example, a mine site, a landfill, a quarry, a construction site, a dealership coverage area, or any other type of worksite known in the art. As machine 10 travels from worksite B to worksite A or in reverse direction from A to B, a satellite 12 or other tracking device may communicate with an onboard locating device 14 to monitor the movement of machine 10. During this travel between worksites, machine 10 may cross a virtual fence 16 also known as a "geo-fence" that separates worksite A from worksite B.

Machine 10 may embody a stationary or mobile machine configured to perform some type of operation associated with an industry such as mining, construction, farming, transportation, power generation, or any other industry known in the art. For example, machine 10 may be an earth moving work machine such as the haul truck pictured in FIG. 1, a dozer, a loader, a backhoe, an excavator, a motor grader, or any other earth moving machine. Machine 10 may alternatively embody a non-earth moving machine such as a passenger vehicle, a stationary generator set, a pumping mechanism, or any other suitable operation-performing machine.

Figure 2:
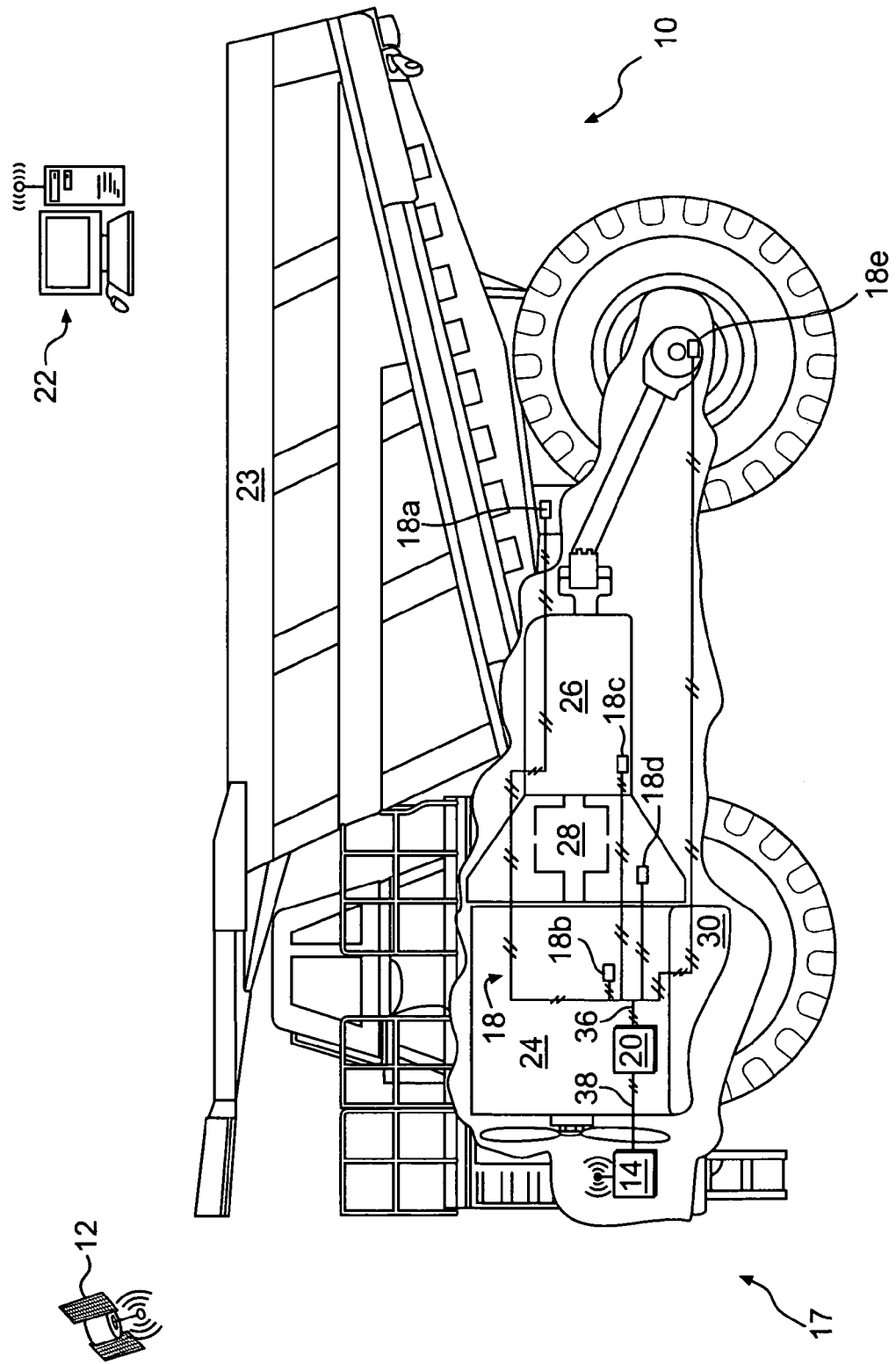
FIG. 2 is a schematic and diagrammatic illustration of an exemplary disclosed component registration system for use with the machine of FIG. 1.

FIG. 2 illustrates machine 10 having an exemplary disclosed interface control system 17. Interface control system 17 may include components that cooperate to automatically gather information from machine 10 during operation of machine 10. For example, interface control system 17 may include locating device 14, an interface control module 18, and a controller 20 configured to communicate with an offboard system 22. It is contemplated that one or more of locating device 14, interface control module 18, and controller 20 may be integrated as a single unit, if desired. It is further contemplated that interface control system 17 may include additional or different components than those illustrated in FIG. 2.

Locating device 14 may be configured to determine a position of machine 10 and generate a signal indicative thereof. For example, locating device 14 could embody a Global Positioning System (GPS), an Inertial Reference Unit (IRU), a local tracking system, or any other known locating device that receives or determines positional information associated with machine 10. Locating device 14 may be in communication with controller 20 to convey a signal indicative of the received or determined positional information to offboard system 22.

Interface control module 18 may include a plurality of sensing devices 18a-e distributed throughout machine 10 and configured to gather data from various components and systems of machine 10. Sensing devices 18a-e may be associated with, for example, a work implement 23, a power source 24, a transmission 26, a torque converter 28, a fluid supply 30, and/or other components and subsystems of machine 10. These sensing devices 18a-e may be configured to automatically gather data from the components and subsystems of machine 10 such as, for example, implement, engine, and/or machine speed or location; fluid pressure, flow rate, temperature, contamination level, and/or viscosity; electric current and/or voltage levels; fluid (i.e., fuel, oil, etc.) consumption rates; loading levels (i.e., payload value, percent of maximum allowable payload limit, payload history, payload distribution, etc.); transmission output ratio; cycle time; grade; performed maintenance and/or repair operations; and other such pieces of information. Additional information may be generated or maintained by interface control module 18 such as the time of day, date, and operator information. The gather data may be indexed relative to the time, day, date, operator information, or other pieces of information to trend the various operational aspects of machine 10.

Controller 20 may include any means for monitoring, recording, storing, indexing, processing, and/or communicating the operational aspects of machine 10 described above. These means may include components such as, for example, a memory, one or more data storage devices, a central processing unit, or any other components that may be used to run an application. Furthermore, although aspects of the present disclosure may be described generally as being stored in memory, one skilled in the art will appreciate that these aspects can be stored on or read from different types of computer program products or computer-readable media such as computer chips and secondary storage devices, including hard disks, floppy disks, optical media, CD-ROM, or other forms of RAM or ROM.

Controller 20 may also include a means for communicating with offboard system 22. For example, controller 20 may include hardware and/or software that enables sending and receiving of data messages through a direct data link (not shown) or a wireless communication link (not shown). The wireless communications may include satellite, cellular, infrared, and any other type of wireless communications that enable controller 20 to exchange information with offboard system 22. It is contemplated that a separate module may alternatively be included within interface control system 17 to facilitate the communication of data between controller 20 and offboard system 22, if desired.

Controller 20 may also be in communication with the other components of interface control system 17. For example, controller 20 may be in communication with interface control module 18 and locating device 14 via communication lines 36 and 38, respectively. Controller 20 may be configured to send communications to and receive communications from offboard system 22 in response to input from interface control module 18 and/or locating device 14. Likewise, controller 20 may be configured to monitor and/or control operation of interface control module 18 and/or locating device 14 in response to communications from offboard system 22. Various other known power and/or communication circuits may also be associated with controller 20 such as, for example, power supply circuitry, signal-conditioning circuitry, solenoid driver circuitry, communication circuitry, and other appropriate circuitry.

Offboard system 22 may represent one or more computing systems of a business entity associated with machine 10, such as a manufacturer, dealer, retailer, owner, service provider, or any other entity that generates, maintains, sends, and/or receives information associated with machine 10. The one or more computing systems may include, for example, a laptop, a work station, a personal digital assistant, a mainframe, and other computing systems known in the art.

Figure 3:
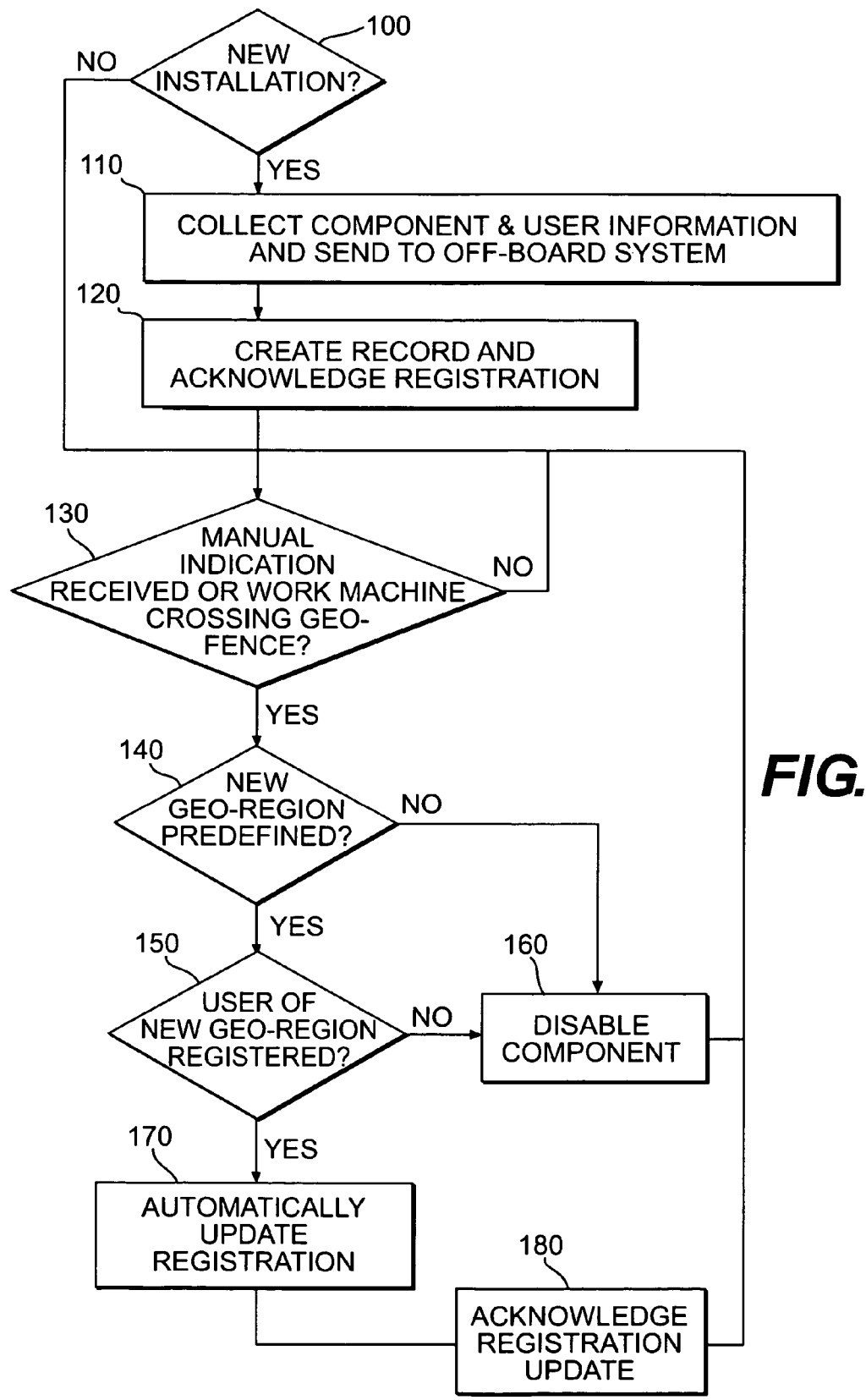
FIG. 3 is a flowchart illustrating an exemplary disclosed method of operating the component registration system of FIG. 2.

FIG. 3 illustrates a flowchart describing a method of automatically registering interface control module 18 with offboard system 22. FIG. 3 will be discussed in the following section to further illustrate the disclosed system and its operation.

INDUSTRIAL APPLICABILITY

The disclosed method and system may provide an efficient and accurate way to register a component of a machine with a service provider. In particular, the disclosed method and system may provide prompt accurate registration of the component by initiating an automatic registration process with the offboard system upon installation of the component on the machine, and by dynamically updating the registration based on a location of the machine. The component registration process will now be described.

As illustrated in the flowchart of FIG. 3, the first step in the component registration process may include determining if a component such as, for example, interface control module 18, has been newly installed (Step 100). Controller 20 may determine that interface control module 18 has been newly installed by monitoring a power or communication signal sent to or received from interface control module 18, by monitoring a software configuration updated upon installation of interface control module 18, or in any other appropriate manner.

If it is determined that interface control module 18 is newly installed, controller 20 may initiate automatic collection of component and user information, followed by the sending of this information to offboard system 22 via controller 20 (Step 110). The component information may include a component identifier such as, for example, an identifying serial number, a model number, a version number, a fabrication or testing date or facility, or other related component information. The user information may include, among other things, information identifying the particular machine 10 into which interface control module 18 is installed, information associated with the selling or servicing dealership, customer information (i.e., name, billing address, intended work location, contact information, etc.), and other user-related information known in the art. The component and user information may be automatically collected via electronic communication with a memory of the newly installed interface control module 18 and/or other components and systems of machine 10, by optical or magnetic scanning of external or internal indices placed on or programmed into interface control module 18 during fabrication or installation, by determining a hardware or electronic configuration of interface control module 18, by communication with offboard system 22, or in any other appropriate manner.

Following receipt of the automatically-collected data, offboard system 22 may create a record within a database thereof and acknowledge completion of the registration process (Step 120). The record may include, among other things, the collected component and user information, and a related geographical area of authorized operation. The geographical area of authorized operation may be manually designated at the time of purchase or lease, or, alternatively, automatically assigned based on the intended or monitored work location of machine 10. The geographical areas of authorized operation may correspond with a particular worksite, a dealership region, a region for which a service associated with the operation of interface control module 18 has been purchased, or any other suitable area. The acknowledgement may include, for example, a hard copy or electronic communication sent to the user, owner, or lessee of machine 10. It is contemplated that the communication may even be electronically sent directly to machine 10, if desired. In addition to the acknowledgement, upon successful registration of interface control module 18, it may be fully activated and made ready for service.

During the useful life of machine 10, it is possible that machine 10 may be re-sold, traded, leased, lent, or otherwise transferred from one user, lessee, or owner to another. In this situation, for billing/reporting/activating purposes, it may be desirable for the registration of the newly installed interface control module 18 to reflect this transference. The disclosed method and system may provide a manual way and/or an automatic way to indicate that such a transference has occurred.

The manual way to indicate that a transference of machine 10 has occurred may include one of the two parties involved in the transference of machine 10 (e.g., either the original transferring party or the new party responsible for receiving machine 10) manually requesting a registration update. It is contemplated that the transference may be manually requested by an operator of machine 10 from within machine 10 by way of, for example, a control device associated with an operator station of machine 10. The automatic way to indicate that a transference of machine 10 has occurred may include comparing a monitored global position of machine 10 to the geographical area of authorized operation described above. It is also contemplated the transference may be automatically detected by comparing changes in techniques of operating machine 10, comparing differences in monitored terrain over which machine 10 has been and is currently operating, or in any other similar manner.

When a monitored global position deviates from the geographical area of authorized operation and the user associated with the monitored global position is not the same as the user of the geographical area of authorized operation, it can be assumed that a transference has occurred, and the registration update process may be automatically initiated. Accordingly, the first step in the registration update process may include determining whether or not a manual indication of transference has been received or machine 10 has crossed a geo-fence into an unauthorized area (e.g., the transference has been automatically detected) (Step 130).

After initiation of the registration update process (e.g., the manual indication of transference has been received or machine 10 has crossed a geo-fence into an unauthorized area), offboard system 22 may determine whether or not the new geo-region is already predefined within the database of offboard system 22 (Step 140). This determination may be made by comparing the monitored global position received via locating device 14 or the position manually indicated as the intended work location of machine 10 with multiple predefined geographical locations stored within the database of offboard system 22. If the monitored or manually indicated global position corresponds with one of the predefined global locations, offboard system 22 may then determine if the user associated with the one of the predefined global locations is enrolled for the service provided with registered components (Step 150). However, if the monitored or manually indicated global position does not correspond with one of the predefined global locations, offboard system may disable operation of interface control module 18 and request manual registration of the global position (Step 160). If the manual indication has not been received and no geo-fences have been traversed by machine 10, control may continue to circulate through step 130.

If offboard system 22 determines that the user associated with the monitored global position is registered (e.g., enrolled for service), the record associated with the particular interface control module 18 and stored within the database of offboard system 22 may modified. Specifically, the service provided with registered components may be disassociated with the original party responsible for machine 10 and re-associated with the new party, thereby automatically updating the registration of interface control module 18 (Step 170). Following the registration update, acknowledgement of the update may be sent to the new party in the same manner outlined in step 120 above (Step 180). However, if offboard system 22 determines that the user associated with the one of the monitored global position is not enrolled for service, offboard system 22 may disable operation and/or service of the particular interface control module 18, and automatically generate a request for enrollment (Step 160).

The disclosed method and system may provide a simple and accurate way to register a machine component. Specifically, because the disclosed system and method provide for automatic registration, the manual effort expended to register the component may be minimal and the likelihood of error associated with the registration process may be reduced. In addition, because registration of the component may be automatically updated, the records associated with the registration may be kept accurate with little or no manual intervention, even when a transference of machine 10 occurs.

It will be apparent to those skilled in the art that various modifications and variations can be made to the method and system of the present disclosure. Other embodiments of the method and system will be apparent to those skilled in the art from consideration of the specification and practice of the method and system disclosed herein. For example, although the disclosed registration system is depicted and described as being associated with an interface control module, it may equally be associated with any other machine component. It is intended that the specification and examples be considered as exemplary only, with a true scope of the disclosure being indicated by the following claims and their equivalents.

What is claimed is:

1. A component registration system for a machine, comprising:
 a component for the machine;
 a data system remote from the machine;
 a locating device configured to determine a global location of the machine; and
 a controller in communication with the component, the locating device, and the data system, the controller being configured to:
  automatically collect information from the component upon installation of the component onto the machine;
  store information associating the component with a first user;
  automatically send the information to the data system to initiate a registration process;
  compare the determined global location received from the locating device to a plurality of predefined global locations;
  compare a first of the plurality of predefined global locations to a second of the plurality of predefined global locations; and
  remove the information associating the component with the first user and store information associating the component with a second user, in response to the comparison indicating the machine has moved from the first of the plurality of predefined global locations to the second of the plurality of predefined global locations.

2. The component registration system of claim 1, wherein the controller is further configured to automatically collect information related to the first user of the component.

3. The component registration system of claim 1, wherein the data system is configured to receive the automatically collected information and respond to the controller with acknowledgement that a registration process has been completed.

4. The component registration system of claim 1, wherein the controller is further configured to send the determined global location to the data system.

5. The component registration system of claim 1, wherein the controller is further configured to limit functionality of the component when the comparison indicates a determined global location of the machine that does not correspond with one of the plurality of predefined global locations.

6. The component registration system of claim 1, wherein the controller is further configured to limit functionality of the component when the comparison indicates a determined global location of the machine corresponding to one of the plurality of predefined global locations that is not associated with a user enrolled for a predetermined service.

7. The component registration system of claim 6, wherein, when the comparison indicates a determined global location of the machine corresponding to one of the plurality of predefined global locations that is not associated with a user enrolled for a predetermined service, a request for enrollment is automatically generated.

8. The component registration system of claim 1, wherein the controller is further configured to send acknowledgement to the second user indicating completion of a registration update process.

9. The component registration system of claim 1, wherein the controller is further configured to initiate comparing the determined global location to the plurality of predefined global locations in response to an indication from one of the first and second users that a transference of the machine from the first user to the second user has occurred.

10. The component registration system of claim 1, wherein, upon installation of the component, a record is created in the data system including information associating the component with one of the plurality of predefined global locations.

11. The component registration system of claim 1, wherein the component is an interface control system configured to collect operational information from the machine.

12. The component registration system of claim 1, wherein the controller is further configured to limit functionality of the component based on the comparison.

13. The component registration system of claim 1, wherein the controller is further configured to automatically generate a request for enrollment for the component based on the comparison.

14. The component registration system of claim 1, wherein the locating device is a global positioning system.

15. A method of registering a component upon installation onto a machine, the component and a data system remote from the machine being in communication with a controller, the method comprising:
using the controller to automatically collect information from the component upon installation of the component onto the machine; and
using the controller to automatically send the information to the data system to initiate a registration process for the component;
determining a global location of the machine;
comparing the determined global location to a plurality of predefined global locations; and
at least one of limiting functionality of the component or automatically generating a request for enrollment for the component based on the comparison.

16. The method of claim 15, further including automatically collecting and sending to the data system information related to a first user of the component.

17. The method of claim 15, further including:
receiving the automatically collected information; and
responding with acknowledgement that the registration process has been completed.

18. The method of claim 15, further including:
updating registration of the component in response to the determined global location.

19. The method of claim 18, wherein updating includes:
sending the determined global location to the data system;
comparing the determined global location to a plurality of predefined global locations;
removing information associating the component with a first user; and
storing information associating the component with a second user in response to the machine moving from a first of the plurality of predefined global locations to a second of the plurality of predefined global locations.

20. The method of claim 19, further including limiting functionality of the component when the comparison indicates a determined global location of the machine that does not correspond with one of the plurality of predefined global locations.

21. The method of claim 19, further including limiting functionality of the component when the comparison indicates a determined global location of the machine corresponding to one of the plurality of predefined global locations that is not associated with a user enrolled for a predetermined service.

22. The method of claim 21, further including automatically generating a request for enrollment when the comparison indicates a determined global location of the machine corresponding to one of the plurality of predefined global locations that is not associated with a user enrolled for a predetermined service.

23. The method of claim 19, further including sending acknowledgement to the second user indicating successful registration update of the component.

24. The method of claim 19, wherein the steps of removing the information associating the component with the first user and storing the information associating the component with the second user are initiated in further response to an indication from one of the first and second users that a transference of the component from the first user to the second user has occurred.

25. The method of claim 19, further including creating a record in the remote data system associating the component with one of the plurality of predefined global locations upon installation of the component onto the machine.

26. A machine, comprising:
a power source configured to produce a power output;
an interface control module configured to monitor an operational aspect of the power source;
a positioning device configured to determine a global location of the machine and to generate a signal indicative of the global location; and a controller in communication with the interface control module, the positioning device, and an offboard data system, the controller being configured to:
- automatically collect information from the interface control module upon installation of the interface control module;
- automatically collect information related to a first user of the interface control module;
- automatically send the collected information to the offboard data system to initiate a registration process;
- receive the signal from the positioning device; and
- automatically initiate a registration update process with the offboard data system in response to the signal.

27. The machine of claim 26, wherein the offboard data system is configured to receive the automatically collected information and respond with acknowledgement that a registration process has been completed.

28. The machine of claim 26, wherein the registration update process further includes:
- comparing the determined global location to a plurality of predefined global locations; and
- disassociating the interface control module with the first user and re-associating the interface control module with a second user in response to the machine moving from a first of the plurality of predefined global locations to a second of the plurality of predefined global locations.

29. The machine of claim 28, wherein the controller is further configured to limit functionality of the interface control module when the comparison indicates a determined global location of the machine that does not correspond with one of the plurality of predefined global locations.

30. The machine of claim 28, wherein the controller is further configured to limit functionality of the interface control module when the comparison indicates a determined global location of the machine corresponding to one of the plurality of predefined global locations that is not associated with a user enrolled for a predetermined service.

31. The machine of claim 30, wherein, when the comparison indicates a determined global location of the machine corresponding to one of the plurality of predefined global locations that is not associated with a user enrolled for a predetermined service, a request for enrollment is automatically generated.

32. The machine of claim 28, wherein the registration update process further includes sending acknowledgement to the second user indicating completion of the registration update process.

33. The machine of claim 28, wherein the registration update process is initiated in further response to a manual indication from one of the first and second users that a transference of the interface control module from the first user to the second user has occurred.

34. The machine of claim 28, wherein, upon installation of the interface control module, a record is created in the offboard data system associating the interface control module with one of the plurality of predefined global locations.

* * * * *

UNITED STATES PATENT AND TRADEMARK OFFICE
CERTIFICATE OF CORRECTION

| | | |
|---|---|---|
| PATENT NO. | : 8,131,605 B2 | Page 1 of 1 |
| APPLICATION NO. | : 11/363256 | |
| DATED | : March 6, 2012 | |
| INVENTOR(S) | : Donnelli et al. | |

It is certified that error appears in the above-identified patent and that said Letters Patent is hereby corrected as shown below:

In the Claims

Column 8, line 9, in Claim 15, delete "comparison." and insert -- comparison;
removing information associating the component with a first user; and
storing information associating the component with a second user in response to the machine moving from a first of the plurality of predefined global locations to a second of the plurality of predefined global locations. --.

Column 8, line 21, in Claim 19, delete "system;" and insert -- system; and --.

Column 8, lines 23-29, in Claim 19, delete "locations; removing information associating the component with a first user; and storing information associating the component with a second user in response to the machine moving from a first of the plurality of predefined global locations to a second of the plurality of predefined global locations." and insert -- locations. --.

Signed and Sealed this
Eighteenth Day of August, 2015

Michelle K. Lee
*Director of the United States Patent and Trademark Office*